United States Patent [19]

Lühmann et al.

[11] Patent Number: 4,590,019
[45] Date of Patent: May 20, 1986

[54] PROCESSES FOR THE PRODUCTION OF FREE-FLOWING NITROCELLULOSE

[75] Inventors: Erhard Lühmann, Bomlitz; Lutz Hoppe; Klaus Szablikowski, both of Walsrode, all of Fed. Rep. of Germany

[73] Assignee: Wolff Walsrode Aktiengesellschaft, Walsrode, Fed. Rep. of Germany

[21] Appl. No.: 647,340

[22] Filed: Sep. 5, 1984

[30] Foreign Application Priority Data

Sep. 26, 1983 [DE] Fed. Rep. of Germany ....... 3334823

[51] Int. Cl.$^4$ .............................................. C06B 21/00
[52] U.S. Cl. .......................................... 264/3.4; 149/2; 149/96; 149/109.6; 264/3.3; 536/35; 536/38
[58] Field of Search .................... 149/2, 109.6, 96; 264/3 C, 3 B; 536/35, 38

[56] References Cited

U.S. PATENT DOCUMENTS 3,897,733 8/1975 Stiefel et al. .................... 149/2 X Primary Examiner—Stephen J. Lechert, Jr.
Attorney, Agent, or Firm—Sprung Horn Kramer & Woods

[57] ABSTRACT

Processes for the production of free-flowing, non-fibrous, alcohol-moistened nitrocellulose, characterized in that the water- or alcohol-moist nitrocellulose is softened with a solvent mixture of a nitrocellulose solvent and a lower aliphatic alcohol and water until the nitrocellulose fibers disappear, the alcohol-containing, liquid phase is decanted off from the two-phase mixture formed and the nitrocellulose-containing phase is processed into granulate using a screw extruder, the quantity of solvent mixture is used amounting to between 75 and 155% by weight, based on dry nitrocellulose, and the components of the mixture, NC-solvent:lower alcohol:water, being present in a ratio of 1:(0.2–4):(0.2–4).

6 Claims, No Drawings

PROCESSES FOR THE PRODUCTION OF FREE-FLOWING NITROCELLULOSE

BACKGROUND OF THE INVENTION

This invention relates to processes for the production of free-flowing, non-fibrous, storable nitrocellulose by briefly treating the water- or alcohol-moistened nitrocellulose with a solvent mixture of a solvent for nitrocellulose and a lower aliphatic alcohol, decanting the alcohol-containing liquid phase and processing the nitrocellulose-containing phase into granulate using a screw extruder.

Because it ignites spontaneously when dry, nitrocellulose (NC) has to be treated with a moistening agent, such as a lower alcohol, preferably methanol, ethanol, isopropanol or butanol, in order to reduce the danger of ignition during storage and transport. This alcohol-moist nitro-cellulose is marketed in the form of fibrous wool or as a compact product. In the first case, the low bulk weight results in high freight costs which is not the case with the compact product. However, since the fibrous structure of the wool remains intact during the compaction process, a large amount of dust generally accumulates during processing and handling in commercial circles, further increasing the danger of ignition.

Accordingly, there is a need to make alcohol-moist nitrocellulose available in free-flowing, preferably granulated form.

Known processes are described in DAS 30 41 085, according to which nitrocelluose is dissolved in a solvent mixture of a solvent and non-solvent for nitrocellulose to form a homogeneous, non-tacky phase from which the volatile constituents, such as water and alcohol, are subsequently removed by distillation, optionally after the required forming process. This known process gives a nitrocellulose which is easy to handle and which is particularly suitable for the production of additives for polyurethane lacquers because the compounds reacting with the isocyanate groups, namely water and alcohol, have been completely removed.

U.S. Pat. No. 3,284,253 describes a process for the production of nitrocellulose moistened with a non-solvent. In this process, the nitrocellulose is first softened by the addition of an amount of an organic solvent to an aqueous nitro-cellulose suspension such that the nitrocellulose structure disappears, and then processed into a granulate, the organic solvent being distilled off and the remaining excess water separated off. A volatile non-solvent, preferably toluene, is added to this moist nitrocellulose and the water azeotrope is distilled off so that a free-flowing nitrocellulose moistened with toluene is ultimately obtained.

The disadvantage of these known processes for the production of free-flowing nitrocelluose lie in the elaborate treatments of the nitrocellulose with the non-solvent, particularly the distillation step for removing the non-solvent used in the softening of the nitrocellulose. This process step can be avoided by the process according to the present invention.

SUMMARY OF THE INVENTION

Accordingly, the present invention provides to processes for the production of free-flowing, non-fibrous, alcohol-moistened nitrocellulose which are characterised in that the water- or alcohol-moist nitrocellulose is softened in a mixture of a solvent for nitrocellulose and a lower aliphatic alcohol, preferably the moistening agent subsequently used for storage, and water until the nitrocellulose fibers disappear, the alcohol-containing liquid phase is decanted off from the two-phase mixture formed and the nitrocellulose-containing phase is processed by known methods into a granulate using a screw extruder, the quantity of mixture used amounting to between 75 and 155% by weight, based on dry nitrocellulose, and the components of the mixture, NC-solvent:lower alcohol:water, being present in a weight ratio of 1:(0.2–4):(0.2–4).

The alcohols used in the solvent mixture for treating the nitrocellulose are preferably the known moistening agents for storage, such as aliphatic alcohols containing from 1 to 4C-atoms, particularly methanol, ethanol, propanol, isopropanol and butanol. Mixtures of these alcohols may also be used.

Suitable solvents for the nitrocellulose also include any of the usual water-miscible solvents, preferably aliphatic ketones, for example acetone.

The nitrocellulose is used in alcohol- or water-moistened form, preferably in water-moistened form. Nitrocelluloses treated in this way may be processed in any viscosity stages into granulates by the process according to the present invention. The process according to the invention is particularly suitable for working-up water-moist nitrocellulose containing from 10.2 to 12.4% by weight of nitrogen.

The process according to the invention is preferably carried out by briefly treating the alcohol- or water-moist nitrocellulose while stirring with the solvent mixture until the nitrocellulose fibers have softened and dissolved (which takes from 1 to 10 minutes and preferably from 2 to 5 minutes), switching off the stirrer and then leaving the mixture standing until a two-phase mixture is formed, separating off the liquid phase, spinning the nitrocellulose-containing phase into filaments in a screw extruder and granulating the resulting filaments. Normally, these granulates contain some residues of the solvent which was used for softening the nitrocellulose. In order to completely remove any solvent residues which may be present, the granulate may be extracted with the moistening agent which is also used for storage of the nitrocellulose.

The free-flowing nitrocellulose produced in accordance with the invention is distinguished by its high powder density and very low dust content which makes it safer to store and transport. The nitrocellulose thus produced treated with moistening agent may be used for the production of any paints and lacquers containing nitrocellulose.

EXAMPLE

In a glass vessel, 100 g of water-moist nitrocellulose consisting of 65 g of dry nitrocellulose (Standard 24E) and 35 g of water are mixed with 80 g of a solvent mixture consisting of 30 g of isopropanol and 50 g of acetone using a stirrer. The stirrer is switched off, the NC-containing mixture is left standing for 5 minutes, the liquid phase formed is separated off and the NC-containing mixture is extruded in a screw extruder into a strand 3 mm in diameter which, after drying in air (approx. 4 mins.), is cut into approx. 4 mm granules.

The granules obtained are then extracted three times in 40 g of isopropanol (1 h/25° C.) and dried until their composition is 65% by weight of NC and 35% by weight of moistening agent.

The powder density of the alcohol-moist, non-fibrous nitrocellulose of this Example amounted to 684 g/l. The granulate was free-flowing and had a very high abrasion resistance.

We claim:

1. A process for the production of free-flowing, non-fibrous, alcohol-moistened nitrocellulose (NC), wherein a water- or alcohol-moist nitrocellulose is softened with a solvent mixture of a nitrocellulose solvent and a lower aliphatic alcohol and water until the nitrocellulose fibers disappear, the alcohol-containing, liquid phase is decanted off from the resulting two-phase mixture and the nitrocellulose-containing phase is processed into a granulate using a screw extruder, the quantity of solvent mixture used being from 75 to 155% by weight, based on dry nitrocellulose, and the components of the mixture, NC-solvent:lower alcohol:water, being present in a weight ratio of 1:(0.2–4):(0.2–4).

2. A process according to claim 1, wherein the nitrocellulose solvent is an aliphatic ketone.

3. A process according to claim 2, wherein the aliphatic ketone is acetone.

4. A process according to claim 1, wherein the nitrocellulose starting material is watermoist nitrocellulose containing from 10.2 to 12.4% by weight of nitrogen.

5. A process according to claim 1, wherein the lower aliphatic alcohol is isopropanol.

6. A process according to claim 1, wherein the lower aliphatic alcohol is the moistening agent for storage.

* * * * *